No. 12,054.

Reissued Nov. 11, 1902.

R. B. FINCH.

EYEGLASSES.

(Application filed Oct. 6, 1902.)

Witnesses.
J. J. Delaney.
Dena Nelson.

Inventor
R. B. Finch
By
Attorney

UNITED STATES PATENT OFFICE.

ROBERT BROOKS FINCH, OF DENVER, COLORADO, ASSIGNOR OF ONE-HALF TO EDWIN T. JONES, OF DENVER, COLORADO.

EYEGLASSES.

SPECIFICATION forming part of Reissued Letters Patent No. 12,054, dated November 11, 1902.

Original No. 709,574, dated September 23, 1902. Application for reissue filed October 6, 1902. Serial No. 126,089.

*To all whom it may concern:*

Be it known that I, ROBERT BROOKS FINCH, a citizen of the United States of America, residing at Denver, in the county of Arapahoe and State of Colorado, have invented certain new and useful Improvements in Eyeglasses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates generally to improvements in eyeglasses, and specifically to the construction of the guard and the means for connecting it with the lens-holder, all of which will be fully understood by reference to the accompanying drawings, in which is illustrated an embodiment thereof.

Figure 1:
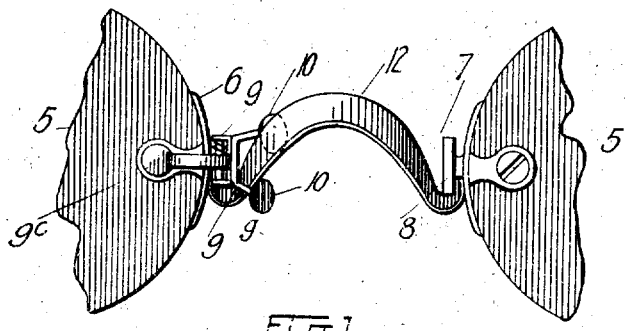
Figure 5:
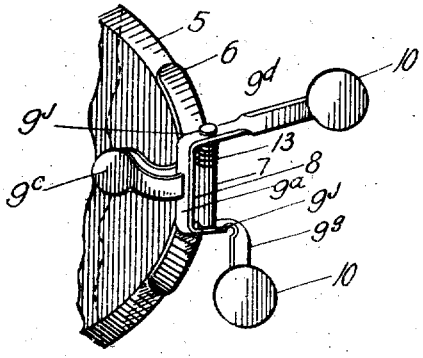
Figure 2:
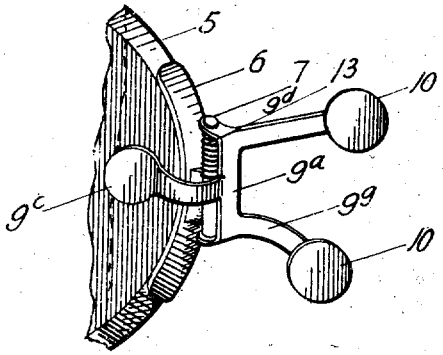
Figure 3:
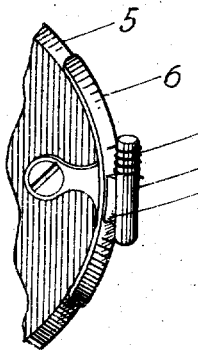
Figure 4:
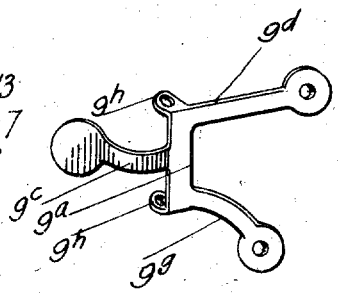

In the drawings, Figure 1 is a front elevation of a pair of eyeglasses equipped with my improvements, the guard being shown in place on one side only. Fig. 2 is a perspective view of the lens with the guard in place. Fig. 3 is a similar view of a lens, the guard being removed to show the post. Fig. 4 is a perspective view of the guard shown in detail. Fig. 5 is a perspective view similar to Fig. 2 and illustrating a modified form of construction.

The same reference characters indicate the same parts in all the views.

Let the numeral 5 designate the lenses, and 6 the rim, mounting, or frame to which the lens is secured. Rigidly attached to the part 6 or lens-holder is a post 7, which projects both above and below a lug 8, the latter forming the connection between the post and the lens-holder.

The guard 9 consists of a vertical part $9^a$ and three arms, (designated by the characters $9^c$, $9^d$, and $9^g$, respectively.) To the free extremities of the parts $9^d$ and $9^g$ are secured the nose-pieces 10. The arm $9^c$ projects from the part $9^a$ in a direction opposite the parts $9^d$ and $9^g$ and is for use in adjusting the guard. The part $9^a$ is provided at its respective extremities with apertured projections or ears $9^h$. The lower ear $9^h$ receives the lower extremity of the post and bears against the lug 8 above, which lug forms a stop, limiting its upward movement. Surrounding the post above the lug 8 is a coil-spring 13, performing the double function of an expansion-spring and a torsion-spring. By virtue of its expansion property its lower extremity bears against the lug 8, which forms a stop therefor, while its upper extremity engages the under surface of the upper ear $9^h$ and holds the guard in place by expansion. By virtue of its torsion property it acts to throw the nose-pieces inwardly toward the bridge 12, whereby the guard is made to grasp the nose of the wearer. For this purpose one terminal of the spring engages the lens-holder 6, while the other terminal bears against the guard. It will thus be understood that the guard is readily detachable by pressing it down, whereby the upper ear $9^h$ is made to compress the spring until the lower ear is released from its bearing on the lower extremity of the post, but by virtue of the engagement of the lower ear with the lug 8 the expansive action of the spring is prevented from pushing the upper ear or bearing off its pintle or post.

My improvement is specially adapted for use with eyeglasses having a rigid bridge, as shown in the drawings, the arms $9^d$ and $9^g$ being spread apart to straddle the bridge.

In the construction shown in Fig. 5 the guard-arms adjacent the vertical part $9^a$ are provided with parallel parts $9^j$, having openings forming bearings for the extremities of the post 7. These apertured parallel parts $9^j$ perform substantially the same function as the ears $9^h$ of the other form of construction.

Having thus described my invention, what I claim is—

1. In eyeglasses, the combination with the bridge and lens-holder, of a post connected with the lens-holder by means of a lug, a guard provided with separated, apertured ears which engage the post, and a spring coiled around the post and bearing against the lug at one extremity and the ear of the guard at the other extremity, the opposite ear engaging the lug on the opposite side from the spring, whereby the guard is locked against movement in the direction of the spring's action.

2. In eyeglasses, the combination with a bridge and the lens-holder, of a post connected with the lens-holder, a guard having two two separated, apertured ears through which the post passes, a spring coiled around the post on one side of its connection with the lens-holder, means for forming a stop for the spring in one direction, the other extremity of the spring engaging an ear of the guard and having a tendency to push it off the post, and means engaging the opposite ear of the guard to prevent the guard-ear acted on by the spring, from being disengaged from the post by the spring, the arrangement being such that by pressing one ear against the spring, the other ear may be disengaged from the post, and the guard readily detached.

3. In eyeglasses, the combination with the bridge and lens-holder, of a post mounted on the lens-holder, a guard provided with separated, apertured ears through which the extremities of the post pass, a spring coiled around the post, a stop on the post engaging the spring at one extremity, the other extremity of the spring bearing against an ear of the guard, and having a tendency to push it off the post, and a stop connected with the post and engaging the other ear of the guard and arranged to hold the guard in place on the post in opposition to the tendency of the spring.

4. In eyeglasses the combination with a bridge and a lens-holder, of a post made fast to the lens-holder, a guard provided with separated, apertured ears, said ears being in sliding engagement with the post, a spring coiled around the post, a stop connected with the post and engaging one extremity of the coil, the other extremity of the coil bearing against one ear of the guard, and a stop connected with the post and engaged by the other ear of the guard, the arrangement being such that the expansion of the spring holds the guard in place on the post, while its torsional force is exerted to throw the guard toward the bridge whereby it grasps the nose of the wearer.

5. In eyeglasses the combination with a bridge and lens-holder, of a post mounted on the lens-holder, a guard provided with two separated, apertured parts forming bearings for the post and slidable thereon, a spring coiled around the post, a stop for one extremity of the coil whose opposite extremity engages a bearing of the guard, and a stop against which the opposite bearing of the guard is held by the action of the spring.

6. In eyeglasses the combination with a bridge and lens-holder, of a post mounted on the lens-holder, a guard having separated, apertured parts forming bearings which are slidable on the post, a spring coiled around the post between the guard-bearings, one extremity of which engages the lens-holder, while the other extremity bears against the guard, a stop for one extremity of the coil whose opposite extremity engages a bearing of the guard, and a stop against which the opposite bearing of the guard is held by the action of the spring.

7. In eyeglasses the combination with a bridge and lens-holder, of a post supported by the lens-holder, a guard having two separated, apertured parts forming bearings for the post and slidable thereon, a spring coiled around the post and engaging at one extremity, one of the bearing parts of the guard, a stop which the opposite extremity of the spring engages, and a stop against which the other bearing of the guard is held by the spring, the arrangement being such that as pressure is applied to the bearing engaged by the spring, the other bearing may be slipped from the post.

8. In eyeglasses the combination with a bridge and lens-holder, of a post mounted on the bridge, a guard mounted on the post and having two separated arms terminating in nose-pieces, said arms being spring-pressed toward the bridge, the guard having two separated bearings engaging the post, a spring coiled around the post and having one extremity engaging one bearing of the guard, a stop against which the opposite extremity of the spring bears, and a stop against which the other bearing of the guard is held by the expansive action of the spring, the arrangement being such that if pressure is applied to the bearing engaged by the spring, the other bearing may be detached from the post.

9. In eyeglasses the combination with a bridge and a lens-holder, of a post mounted on the lens-holder, a guard provided with two separated apertured parts forming bearings for the post and slidable thereon, a spring coiled around the post, a stop on the frame preventing longitudinal movement of the spring, said spring engaging a bearing of the guard, and a stop against which the opposite bearing of the guard is held by the action of the spring, substantially as described.

10. In combination with a pair of lenses and a bridge, a pair of upright pivots one at each end of the bridge, a nose-guard journaled on each pivot and consisting of a handle portion lying in front of the bridge and adjacent lens and a pair of arms extending inwardly and spread apart to straddle the bridge and provided with bearing-tips at their extremities, and springs pressing the tip-carrying ends of the arms toward each other.

11. The combination with a pair of lenses and a bridge, of a pair of upright pivots mounted on the bridge, a nose-guard journaled on each pivot and consisting of a handle portion lying in front of the bridge and a pair of arms extending inwardly and spread apart to straddle the bridge and provided with bearing-tips at their extremities, and springs pressing the tip-carrying ends of the arms toward each other.

12. The combination with a pair of lenses and a bridge, of a pair of nose-guards pivotally mounted on the bridge, each nose-guard consisting of a handle portion lying in front of the bridge, and a pair of arms extending inwardly and spread apart to straddle the bridge, said arms being provided with bearing-tips at their extremities, and springs pressing the tip-carrying ends of the arms toward each other.

13. The combination with a pair of lenses and a bridge, of a nose-guard pivotally mounted at each end of the bridge and consisting of a handle portion lying in front of the bridge, and a pair of arms extending inwardly and spread apart to straddle the bridge, said arms being provided with bearing-tips at their extremities, and springs pressing the tip-carrying ends of the arms toward each other.

14. In eyeglasses, the combination with a pair of lenses and a bridge, of a pair of spring-pressed nose-guards suitably mounted, each consisting of a handle portion lying in front of the bridge, and a pair of inwardly-extending arms spread apart to straddle the bridge, their free extremities being adapted to engage the nose of the wearer.

15. In eyeglasses, the combination with a a pair of lenses and a bridge, of a spring-actuated nose-guard movably mounted at each end of the bridge and consisting of a handle portion lying in front of the bridge, and a pair of arms extending inwardly and spread apart to straddle the bridge, the free extremities of said arms being adapted to engage the nose of the wearer.

16. In eyeglasses, the combination with a pair of lenses and a bridge, of a pair of nose-guards movably mounted, each nose-guard consisting of a pair of arms projecting inwardly and spread apart to straddle the bridge, and a handle portion lying in front of the bridge, the free extremities of the said arms being adapted to engage the nose of the wearer, and springs pressing the arm extremities of the two guards toward each other.

17. In eyeglasses, the combination with a pair of lenses and a bridge, of a pair of nose-guards suitably mounted, each consisting of a handle portion lying in front of the bridge, and a pair of arms extending inwardly and spread apart to straddle the bridge, the extremities of the arms being spring-pressed to engage the nose of the wearer, and the said nose-engaging arm extremities of the two guards being separated by pressing their handle portions toward each other.

18. In eyeglasses, the combination with a pair of lenses and a bridge, of a pair of spring-actuated swinging nose-guards, each having a handle portion projecting forwardly from the bridge, and two inwardly-extending arms spread apart to straddle the bridge, the free extremities of the arms being adapted to engage the nose of the wearer, the nose-engaging extremities of the arms of each nose-guard being spring-pressed toward the corresponding parts of the other nose-guard.

In testimony whereof I affix my signature in presence of two witnesses.

ROBERT BROOKS FINCH.

Witnesses:
A. J. O'BRIEN,
DENA NELSON.